R. Ross,
Globe Valve,
Nº 11,591. Patented Aug. 22, 1854.
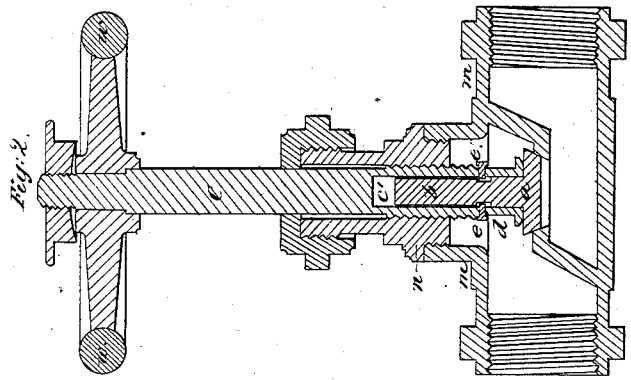
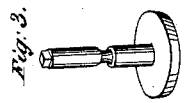
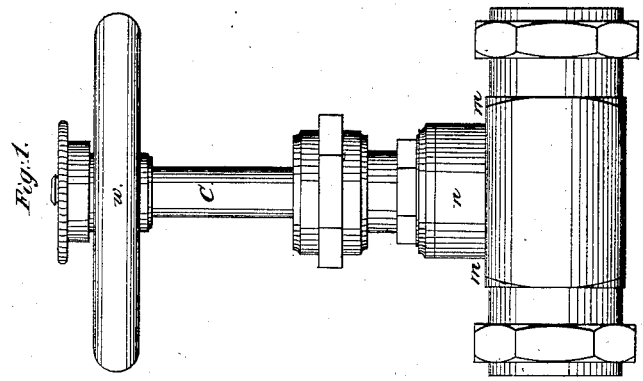

UNITED STATES PATENT OFFICE.

ROBERT ROSS, OF PHILADELPHIA, PENNSYLVANIA.

STEAM-VALVE.

Specification of Letters Patent No. 11,591, dated August 22, 1854.

*To all whom it may concern:*

Be it known that I, ROBERT ROSS, of Philadelphia, in the county of Philadelphia and State of Pennsylvania, have invented an Improvement in Valve-Cocks for Steam, Water, &c., and that the following is a full, clear, and exact description of the principle or character which distinguishes it from all other things before known, and of the usual manner of making, modifying, and using the same, reference being had to the accompanying drawings, of which—

Figure 1 is a front view of the valve, &c.; Fig. 2 a sectional horizontal view of the valve.

My invention consists in so arranging the stem and plug of a valve cock, for either water or steam, as to avoid the friction and liability to twist off, so common in cocks or valves where the plug or valve is turned round with the handle or screw used to raise it.

The stem $b$ of a common conical valve $a$ enters the hollow $c'$ in the lower part of the valve rod $c$. The foot flange of the valve rod rests on the upper surface of the valve $a$. A screw on pin $e$ passes through the tubular side of the valve rod so as to fit into the circular groove $a$ on the valve stem $b$ allowing a little play. The outside of the lower part of the valve rod is provided with a screw thread within a nut $n$ which nut is screwed firmly to the upper part $m\ m$ of the valve of the pipe or chest. The upper part of the valve rod is provided with a handle or ring $w$ that by screwing the valve rod upwards it will raise the valve from its seat with a nearly perpendicular pull, and without the twist which in the valves commonly used often produces a breaking of the stem. By screwing the valve rod down, the valve will be pressed toward its seat with a uniform pressure in all parts of its circumference. The valve rod passes through a stuffing box in the ordinary way.

What I claim as my improvement in steam valves, is—

The mode herein set forth of constructing the valve, the same consisting in the loose or detached valve and stem or guide, combined with the hollow valve rod, in the manner and for the purposes herein set forth.

ROBERT ROSS.

Witnesses:
   TOLMIE CAMPBELL,
   ALEX$^R$. DOUGLAS.